(12) United States Patent
Thomas

(10) Patent No.: US 8,973,744 B2
(45) Date of Patent: Mar. 10, 2015

(54) CURVABLE CONVEYOR ROLLER SUPPORT

(71) Applicant: Double T Equipment Ltd., Airdrie (CA)

(72) Inventor: Thomas M. Thomas, Cochrane (CA)

(*) Notice: Subject to any disclaimer, the term of this patent is extended or adjusted under 35 U.S.C. 154(b) by 0 days.

(21) Appl. No.: 14/173,952

(22) Filed: Feb. 6, 2014

(65) Prior Publication Data

US 2014/0299452 A1 Oct. 9, 2014

Related U.S. Application Data

(60) Provisional application No. 61/807,909, filed on Apr. 3, 2013.

(51) Int. Cl.
 *B65G 13/12* (2006.01)
(52) U.S. Cl.
 CPC .................................. *B65G 13/12* (2013.01)
 USPC .................................. 198/861.2; 198/861.1
(58) Field of Classification Search
 USPC ............................. 198/780, 782, 861.1, 861.2
 See application file for complete search history.

(56) References Cited

U.S. PATENT DOCUMENTS

| | | | | | |
|---|---|---|---|---|---|
| 2,512,610 | A | * | 6/1950 | Cartlidge | 198/861.2 |
| 2,795,315 | A | * | 6/1957 | Hahir et al. | 198/803.3 |
| 4,449,665 | A | * | 5/1984 | Goldfarb et al. | 238/10 R |
| 4,742,904 | A | * | 5/1988 | Miller | 198/735.6 |
| 5,033,605 | A | * | 7/1991 | Marquart | 198/300 |
| 5,043,052 | A | * | 8/1991 | Sakai | 204/623 |
| 5,150,655 | A | * | 9/1992 | Sakai | 104/89 |
| 6,964,333 | B2 | * | 11/2005 | Ledingham | 198/841 |
| 7,275,638 | B2 | * | 10/2007 | Rundqvist | 198/861.1 |
| 7,438,180 | B1 | * | 10/2008 | Taylor et al. | 198/861.2 |
| 7,562,764 | B2 | * | 7/2009 | Schmidt et al. | 198/735.6 |
| 7,637,368 | B2 | * | 12/2009 | Andreoli | 198/836.3 |
| 7,677,181 | B2 | * | 3/2010 | Boyl-Davis et al. | 105/29.1 |
| 8,349,048 | B2 | * | 1/2013 | Volkmann | 55/502 |
| 8,776,999 | B2 | * | 7/2014 | Yohe et al. | 198/861.2 |
| 2004/0011628 | A1 | * | 1/2004 | Koeda et al. | |

* cited by examiner

*Primary Examiner* — Douglas Hess

(57) ABSTRACT

A curvable roller conveyor support, for supporting a longitudinally spaced apart array of transverse roller axles, the support comprising: a dentate elongate plate being laterally symmetric about a longitudinal centerline and having a plurality of lateral edge cutouts defining a plurality of longitudinally spaced apart opposing pairs of transverse arms, each arm having: a proximal end joined to an adjacent arm with a web having a plurality of central narrowed waist portions; and a distal end bent upwards defining a flange with a roller axle mount; and an elongate base secured to an underside surface of the dentate plate, whereby the central narrowed waist portions are bent and/or twisted during mounting to the base to follow a curved line in two or three dimensional space.

11 Claims, 5 Drawing Sheets

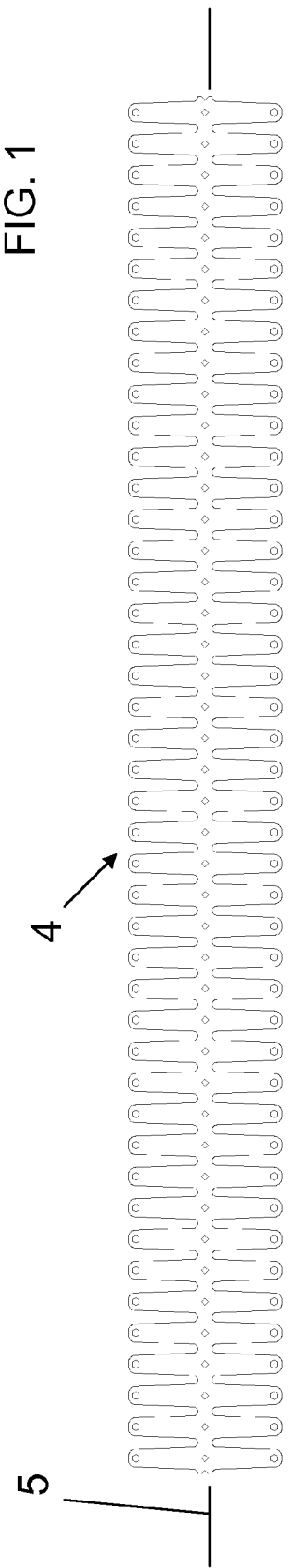
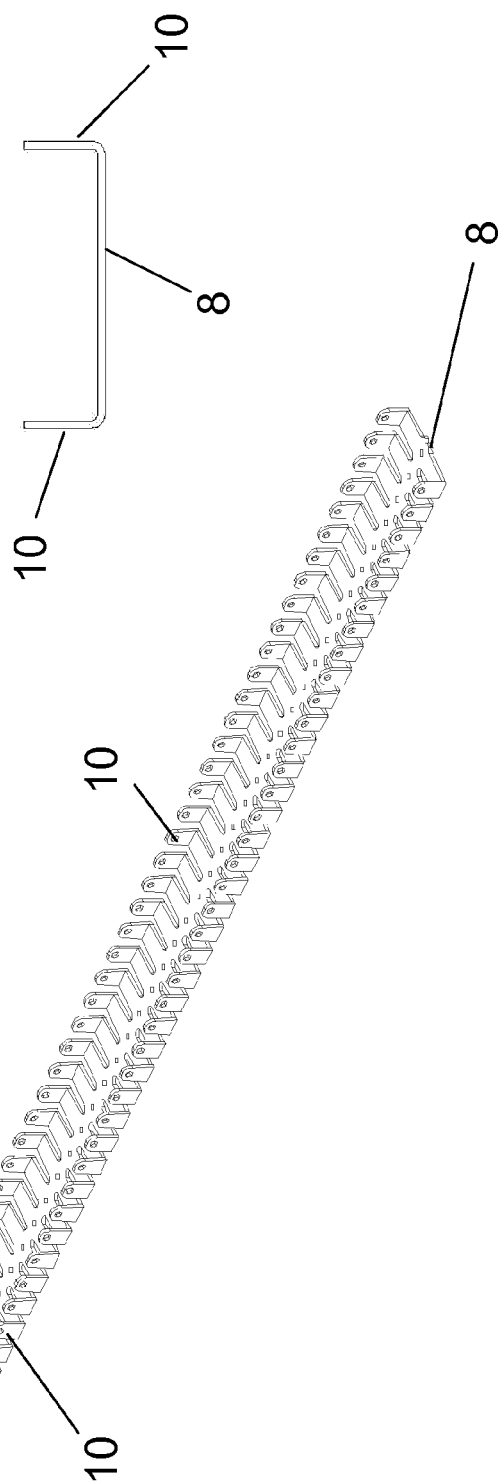
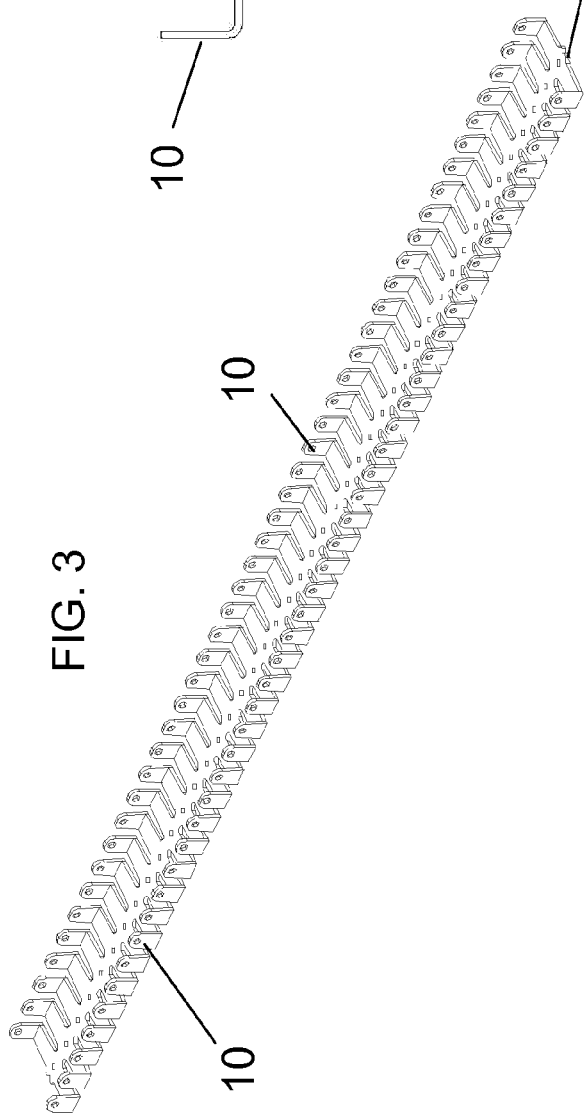

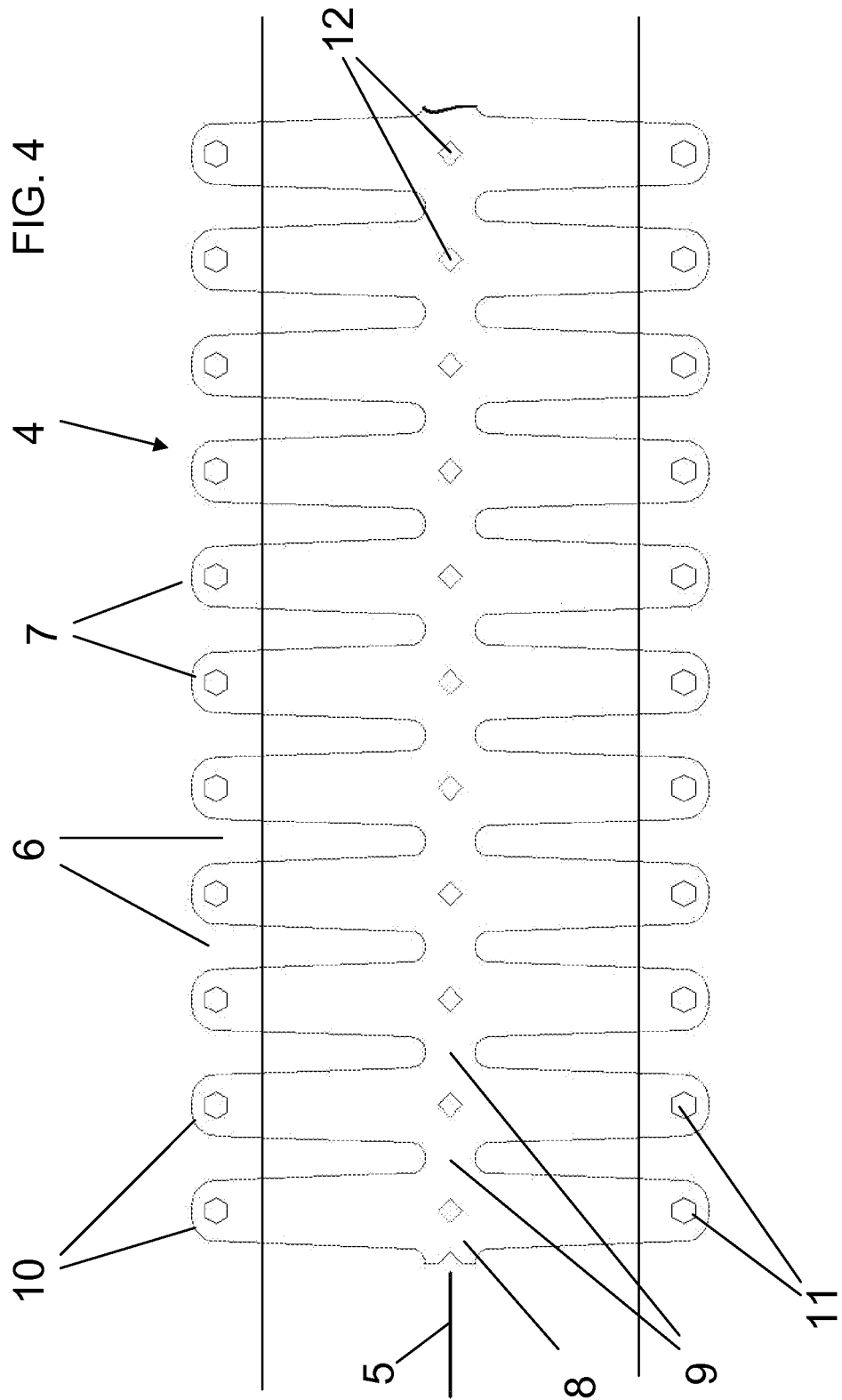

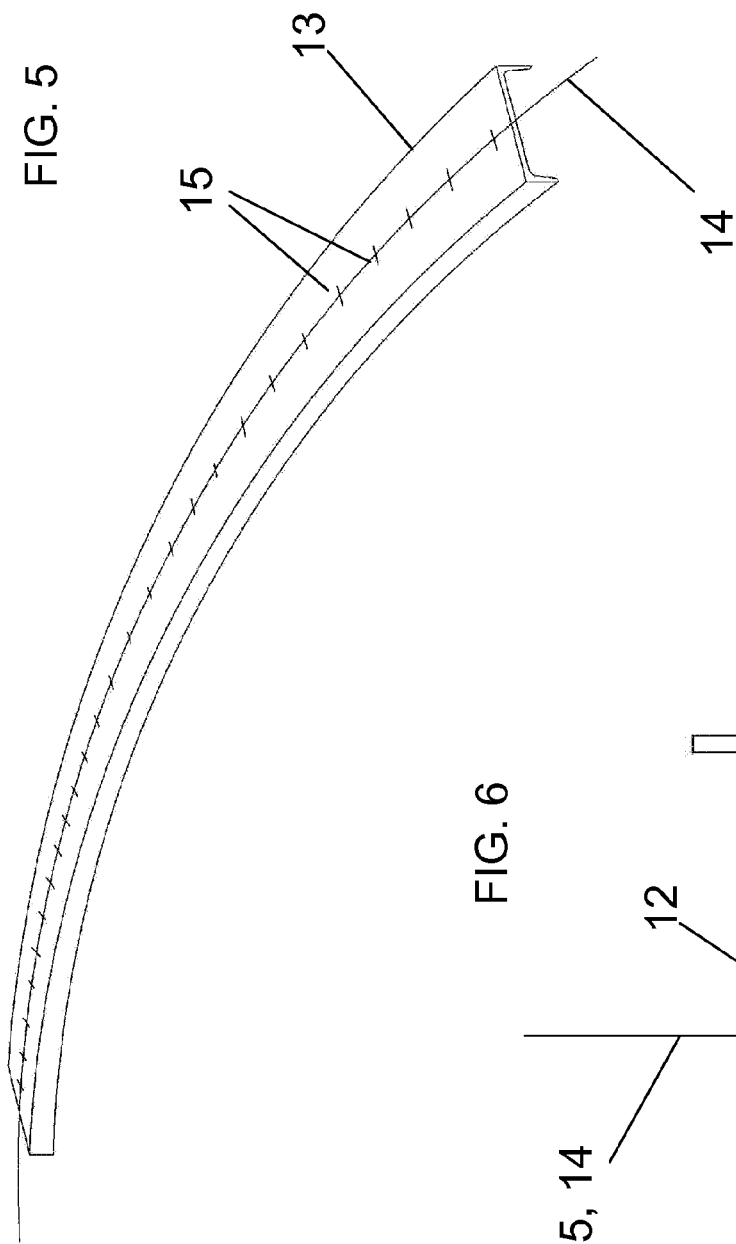
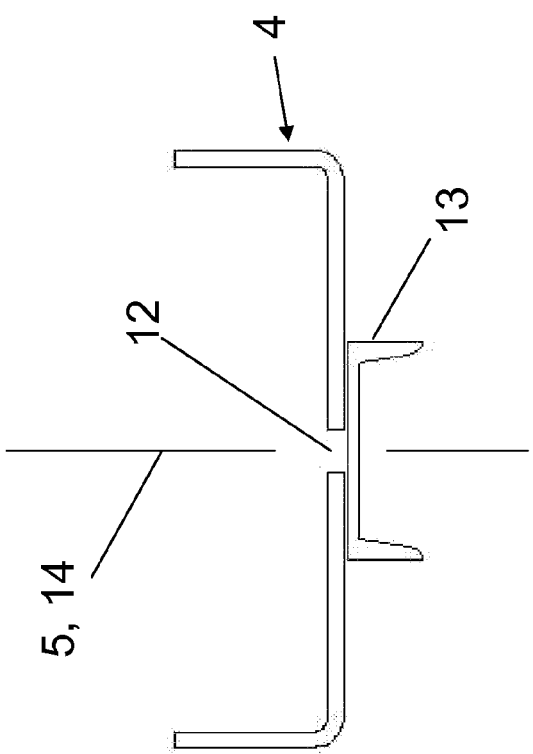

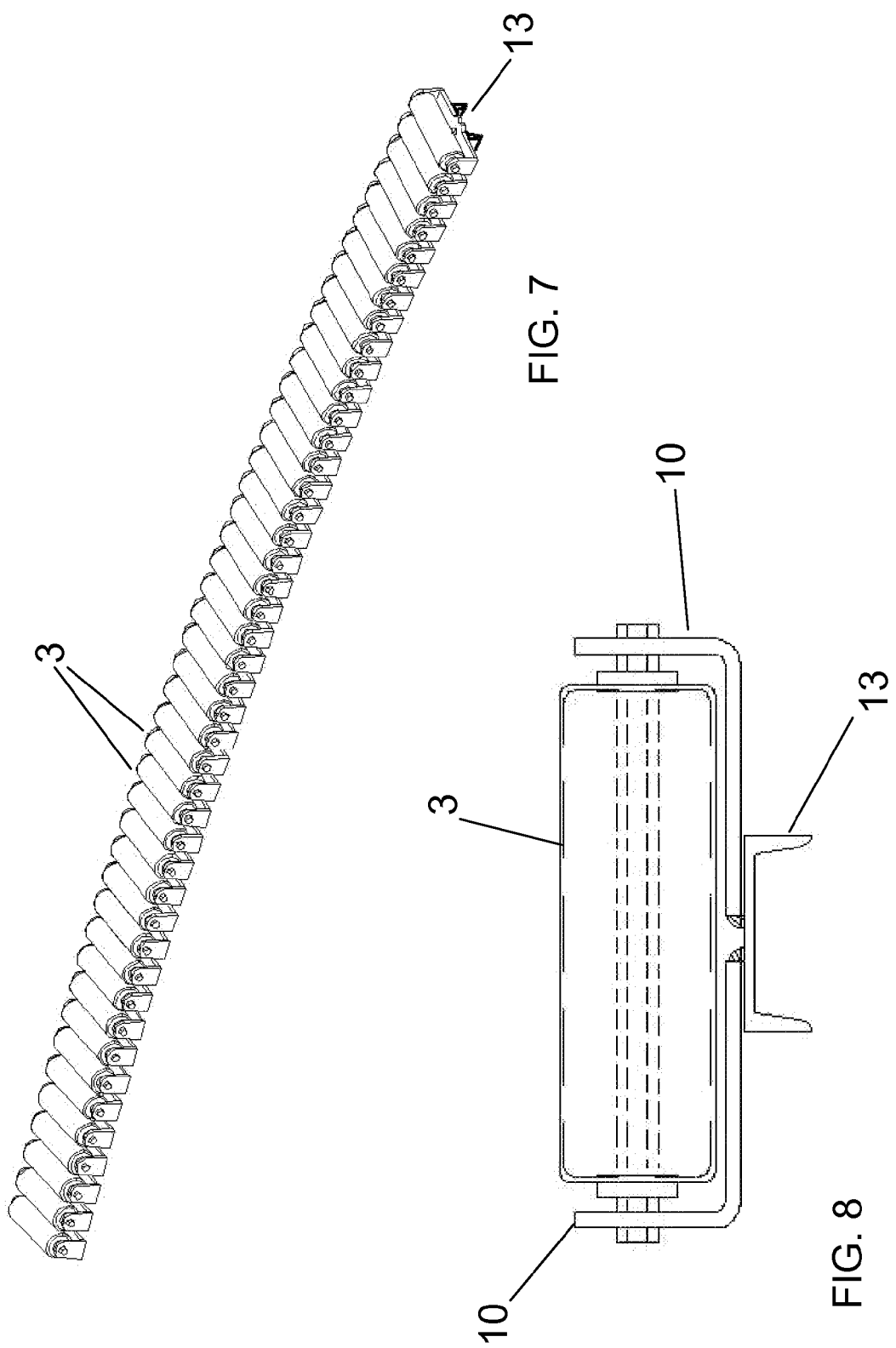

CURVABLE CONVEYOR ROLLER SUPPORT

TECHNICAL FIELD

The invention relates to a curvable conveyor roller support for constructing roller conveyors to follow non-standard curved, banked, spiral and helical shapes without the need for complex geometric calculation and the detailed layout of roller mount locations of conventional methods.

BACKGROUND OF THE ART

The conventional method of constructing gravity driven roller conveyors involves two longitudinal spaced apart rails with rollers mounted between the rails. The rails can be angle shapes, channels or other standard structural profiles commonly available in steel or aluminum. The rails support the roller ends and the loads carried by the rollers. The rails can be supported by legs or other structures suitable to the installation. Rails can also support scanners, sensors and bumpers to control the motion of boxes, pallets or trays on the rollers.

Where a curved conveyor is required having a permanent configuration, the rails are rolled to follow the appropriate curvature. The spacing of rollers is varied along the length to locate rollers transverse to the curved rails. In some cases tapered rollers are used in curved conveyor sections which adds to the cost and complexity of manufacture. An alternative curved conveyor having a variable configuration has a scissor structure mounted on wheels that flexes to conform the conveyor to a curved path for temporary use such as loading and unloading trucks.

The complexity of manufacturing conventional curved conveyors has led to relatively high costs compared to a straight conveyor. To simplify manufacturing and reduce costs, conveyor manufacturers have produced curved conveyors with a predetermined constant radius of curvature.

For example, a circular conveyor section is manufactured to span an arc of 90 degrees or 45 degrees of a circular arc having a fixed radius of 5 feet, 10 feet or 15 feet. These prefabricated conveyor sections are combined with other curved sections and straight conveyors to produce a conveyor path that approximates the desired path. A similar approach is used in plumbing for example where standardized 90 degree and 45 degree sections are manufactured in various sizes to be used with straight sections to approximate the desired shape.

Due to standardization of the conventional curved sections, the radii of curvature are constant and so the roller mount spacing is constant and known but different on the inside rail and outside rail. However standardization enables the manufacturer to reduce costs through repetition in standardized jigs and allows the manufacturer to stock standardized parts in inventory for rapid sale and to make manufacturing predictable.

The conventional method of manufacturing a curved conveyor does not allow optimization of the conveyor path and restricts customization. A customer who requests a non-standard conveyor configuration that cannot be assembled from readily available standard pre-manufactured sections, will encounter significant cost increases. The manufacturer of a non-standard curved conveyor would be required to calculate and layout the locations of the conveyor roller mounts in a customized process which increases labour costs and lead time required for manufacture.

Although the conventional method of manufacturing can be adapted for complex curved shapes, the need for a customized design and manufacturing procedure makes the cost of complex curved shapes impractical. Accordingly complex shapes are assembled from standardized circular curved sections and straight sections to approximate the optimum or ideal configuration.

The ideal or optimum path for a curved conveyor would not include the abrupt changes in direction inherent in the use of standardized sections. For example if a box is conveyed down a straight line and then immediately into a circular curve, the box will continue in a straight line unless it collides with a bumper to retain the box in the curved section. The collision results in friction that slows the box down and repeated collisions can damage the box and bumper. A smoother transition could be provided using a spiral transition curve between the straight and circular sections, however a spiral curve requires more complex calculation and layout for bending the rails and spacing the roller mountings. Spiral transition curves are used in road design, railway track layout and roller coaster track design for the same purpose, namely, to avoid the uncomfortable lateral deceleration and bumping that would otherwise occur due to abrupt changes in direction.

Features that distinguish the present invention from the background art will be apparent from review of the disclosure, drawings and description of the invention presented below.

DISCLOSURE OF THE INVENTION

The invention provides a curvable roller conveyor support, for supporting a longitudinally spaced apart array of transverse roller axles, the support comprising: a dentate elongate plate being laterally symmetric about a longitudinal centerline and having a plurality of lateral edge cutouts defining a plurality of longitudinally spaced apart opposing pairs of transverse arms, each arm having: a proximal end joined to an adjacent arm with a web having a plurality of central narrowed waist portions; and a distal end bent upwards defining a flange with a roller axle mount; and an elongate base secured to an underside surface of the dentate plate, whereby the central narrowed waist portions are bent and/or twisted during mounting to the base to follow a curved line in two or three dimensional space.

DESCRIPTION OF THE DRAWINGS

In order that the invention may be readily understood, one embodiment of the invention is illustrated by way of example in the accompanying drawings.

FIG. 1 is a plan view of a blank or plate of metal that has been cut to a dentate elongate shape with pairs of arms with holes and a web with narrow waist sections to be formed into a support for a roller conveyor.

FIG. 2 is a cross-sectional view of the plate of FIG. 1 with the distal ends of the arms bent upwards to define a pair of flanges with holes to provide a roller axle mount.

FIG. 3 is an isometric view of the plate with bent flanges of FIG. 2.

FIG. 4 is a detail of the plate shown in FIG. 1.

FIG. 5 is an isometric view of a channel profile that has been curved to form an elongate base to be secured to the underside surface of the dentate plate of FIGS. 1-4.

FIG. 6 is a cross-sectional view of the channel of FIG. 5 and the plate with bent flanges of FIG. 2 also bent in the plane of the web to be assembled together with centerlines aligned to the predetermined curvature path of the centerline of the conveyor.

FIG. 7 is an isometric view of the assembled plate, channel and rollers to form a curved roller conveyor.

FIG. 8 is a cross-sectional view of the conveyor of FIG. 7 showing fillet welds in a hole in the plate to secure the curved channel and curved plate together.

Figure 9:
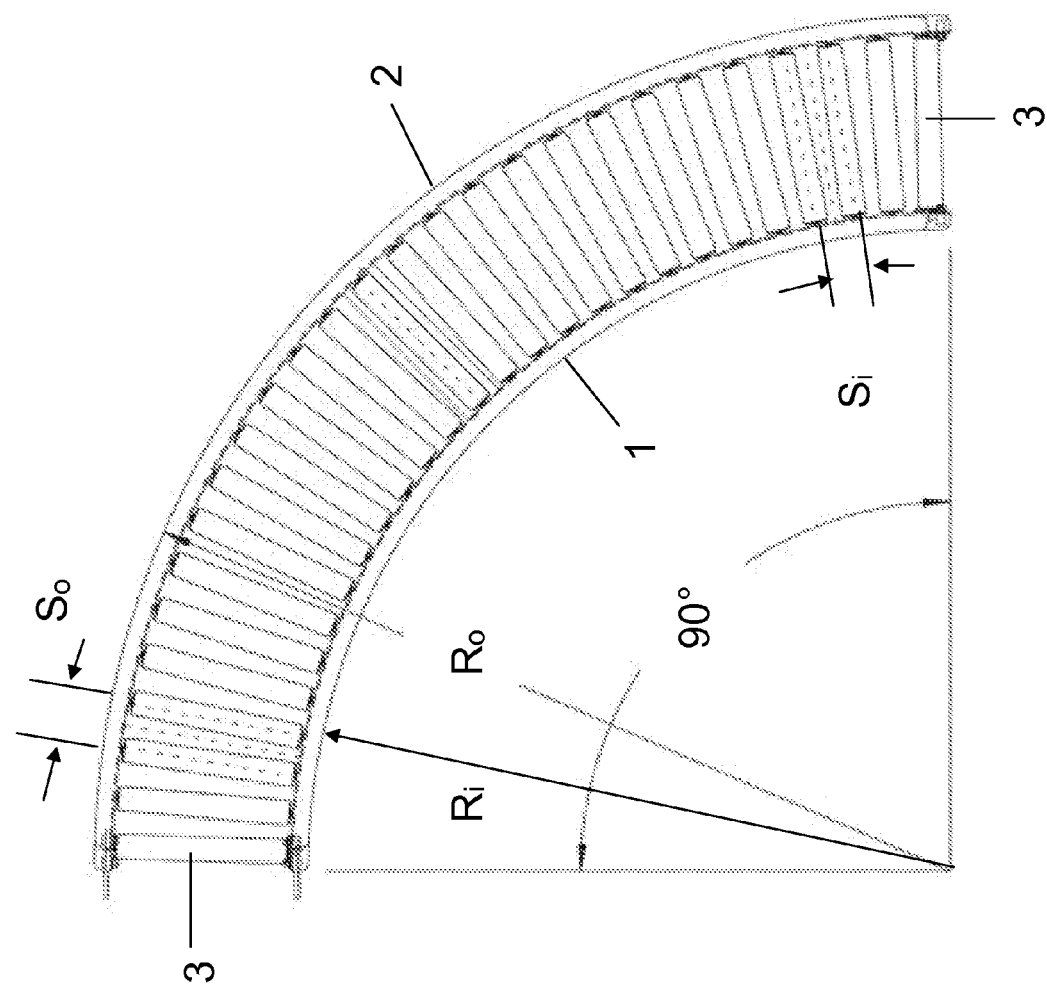
FIG. 9 is a plan view of a prior art conventional roller conveyor section pre-manufactured to span an arc of 90 degrees with a predetermined and constant radius of curvature.

Further details of the invention and its advantages will be apparent from the detailed description included below.

DETAILED DESCRIPTION OF PREFERRED EMBODIMENTS

FIG. 9 shows a conventional prior art curved roller conveyor section that spans an arc of 90 degrees. Such prior art conveyor sections are pre-manufactured in standard sizes and dimensions then combined with other curved sections or straight sections in an installed conveyor system. The standardization of such designs permits a manufacturer to simplify the design, reduce costs and reuse jigs to build multiple conveyors of identical size and shape.

The conventional roller conveyor has an inside rail 1 rolled to have a radius $R_i$ and an outside rail 2 rolled to a radius $R_o$. Rails can be angles, channels, hollow structural sections or other common readily available steel or extruded aluminum profiles. In the example illustrated, simple cylindrical rollers 3 are mounted perpendicular to each rail 1, 2 at the two ends of the roller axles in holes or with brackets.

Since the inside radius $R_i$ is smaller than the outside radius $R_o$, the spacing $S_i$ between roller mountings on the inside rail 1 is less than spacing $S_o$ between roller mountings on the outside rail 2. However since the inside radius $R_i$ and outside radius $R_o$ are constant throughout the arc, the spacings $S_i$ and $S_o$ are constant as well. If a more complex geometry is contemplated, the dramatic increase in costs to build a custom made conveyor will generally persuade a purchaser that use of standardized components is a reasonable compromise.

The labour involved in laying out the spacing of roller mounts can be reduced by using patterns, templates and jigs for common standard roller spacings and radii. However when one parameter is changed, the roller spacing changes. Changing any one of the parameters such as: roller length; roller diameter; inside radius; or outside radius, results in a different roller spacing $S_i$ and $S_o$. Accordingly, the manufacturer's of conveyors have conventionally restricted the choices to a catalogue of common standard configurations and are not inclined to offer custom shapes or sizes except at a relatively high cost to compensate for the increased labour costs, layout jigs and shop floor occupancy time. As described below the invention offers purchasers more choices that better suit the ideal configuration for conveyors without the impractical high costs of conventional methods of manufacture.

The invention has further benefit in that complex geometries such as spirals, parabolas and helixes can be provided at reasonable cost. For example as noted above, to reduce lateral deceleration forces caused by abrupt changes in direction, spiral transition curves are used for horizontal curves in highway road design, railway track design, and roller coaster track design among other applications.

A commonly used spiral curve provides a smooth transition between straight section and a circular curved section. Such a spiral curve has a varying spiral radius ($R_{spiral}$ is a function of the spiral arc length) that gradually changes through the spiral arc from matching the straight section (radius of infinity) to match the circular curved section (radius is a constant dimension). If the conventional method of manufacturing curved conveyors were to be used to make a spiral transition, the costs and labour required would be prohibitive. In a spiral, the radius changes throughout the arc and since the rollers are aligned on the radial line perpendicular to the rails, the spacing between each roller would also gradually change as the spiral transitions from a straight section to a circular curve section. On a straight section the spacing is constant on both rails whereas on a circular curved section the spacing is different on the inside and outside rails. A spiral section would have to transition not only the curvatures of the rails but the roller spacing along inside and outside rails as well.

Accordingly, spiral curved conveyors, parabolic curved conveyors, helixes and other complex geometries are generally not offered at low cost and are available only as custom made conveyors at relatively high cost and long delivery times by manufacturers using conventional methods.

The invention provides a method of manufacturing conveyors with complex curvatures and non-standard radii while avoiding the significant cost increases associated with conventional manufacturing methods. Further the invention provides a cost effective method of manufacturing a roller conveyor to an optimum geometric configuration or to a standard configuration without significant difference in cost or labour involved. Therefore the invention provides a method of manufacturing that frees the designer to adopt an optimal configuration without paying a major cost penalty over use of standardized components.

The invention provides a method of manufacturing a curvable roller conveyor support where a longitudinally spaced apart array of transverse rollers are supported by their axles on spaced apart pairs of arms extending from a bendable web or spine of metal plate.

Manufacturing begins with an elongate rectangular plate of metal which is cut into the type of shape shown in the example of FIG. 1 and detail view of FIG. 4, using any conventional method suitable for the material such as water jet cutting, plasma cutting, oxy-fuel flame cutting or punching. The flat elongate rectangular plate of metal is cut into a dentate elongate plate 4 that is laterally symmetric about its' longitudinal centerline 5. The cutting process forms a longitudinally spaced apart series of lateral edge cutouts 6 which in the example illustrated are generally V-shaped with rounded inside edges for ease of cutting and to avoid stress concentrations. The cutouts 6 define a series of longitudinally spaced apart opposing pairs of transverse arms 7, illustrated with a rounded distal end. Each arm 7 has a proximal end joined to an adjacent arm with a central web 8 having a plurality of central narrowed waist portions 9. As indicated in FIGS. 2-4, the distal end of each arm 7 is bent upwards along the fold lines in FIG. 4 using a brake press for example. As best seen in FIGS. 2-3, the bending of each of the arms 7 of the flat dentate plate 4 defines a flange 10 on each arm 7. In the example illustrated, each flange 10 is cut with a hexagonal roller axle mounting hole 11 to receive a hexagonal end of a roller axle. Other roller mounting holes, slots or brackets can be easily made when the plate 4 is flat.

The plate 4 also includes diamond shaped holes 12 along the plate centerline 5. The diamond holes 12 serve two purposes described in detail below, namely: to align the centerline 5 of the plate 4 with the centerline 14 of the base channel 13; and to allow the plate 4 to be welded to the supporting base channel 13.

FIG. 5 shows a curved channel profile that serves as an elongate supporting base 13 that is secured to the underside surface of the dentate plate 4 as indicated in FIGS. 6-8. The channel base 13 is merely an example and any type of curved structure can be used, or a flat structure with a curved line drawn on it for alignment. A channel base 13 can be formed on a rolling press to a constant circular radius or to a variable spiral radius of any dimension suitable for the channel size. Alternatively a base 13 can be formed in a hydraulic press or fabricated from plates welded together in any configuration desired.

The channel base 13 is marked with a centerline 14 for alignment of the center of the assembled conveyor roller support. The locations of the diamond holes 12 along the centerline 14 are also marked with transverse centerlines 15 of the arms 7 to position the plate 4.

Next one end of the plate 4 is mounted to the base 13 by aligning the centerlines 5, 14 at one end of the plate 4 as shown in FIG. 6. As shown in FIG. 8 the plate 4 is secured by welding through a first diamond hole 12. At this point the plate 4 remains straight as shown in FIG. 3, while the channel base 13 is curved. However at one diamond hole 12 at the end of the plate 4 and channel base 13, the centerlines are aligned and the weld is made in the diamond hole 12 to secure the plate 4 and base 13 together.

Next the waist portions 9 of the web 8 are bent incrementally, the diamond holes 12 are progressively aligned with the base centerline 14, and progressively welded in place through the diamond holes 12 starting at one end of the plate 4 and working to the opposite end. When the plate 4 is relatively thin the waist portions 9 are weak in the plane of the plate 4, and the waist portions 9 can be bent manually or with clamps. For thicker plates 4 or where the waist portion 9 offers greater resistance to bending in the plane of the web 8, hydraulic presses may be used to bend the waist portions 9. Minimal thickening and thinning of the plate thickness in the waist portions 9 may occur due to bending compression and tension however without significant detriment. The waist portions 9 serve to weaken the web 8 and allow bending while retaining the arms 7 spaced apart. Minimal buckling of the waist portions 9 may also occur due to compression in bending however by choosing narrow waist portions 9 any buckling can be control to a local area and is of no structural significance because the channel base 13 provides adequate structural support.

To form a banked conveyor, where the rollers are sloped inwardly towards the center of the curvature, or a helical conveyor where the rollers descend in elevation while following a horizontal curve, the waist portions 9 can be bent or twisted in a plane orthogonal to the plane of the plate 4, whereby the longitudinal centerline 5 of the plate 4 follows a two dimensional shape. In a two dimensional curved conveyor, the channel base 13 or other base structure would be curved two dimensionally as well to provide support for the plate 4.

Once all of the diamond holes 12 of the plate 4 have been progressively aligned and welded to the channel base 13, as shown in FIGS. 7-8, the rollers 3 can be installed into the hexagonal mounting holes 11 in the flanges 10. The channel base 12 can be combined with other structural members such as legs or wall brackets (not shown) to secure the conveyor when installed.

It will be understood that the method described above is not limited to any shape of curve in a plane or in three dimensional space. Provided that the channel base 13 or other structure can be fabricated or bent into a two or three dimensional curve, the flexibility of the plate 4 with thin waist portions 9 ensures that the web 8 can be bent to conform to the base 13.

The plate 4 can be bent into various two dimensional planar shapes for example where at least a part forms : a straight line; a circular line having a constant radius of curvature; a spiral line having a varying radius of curvature; and a parabolic line. The plate 4 can be secured to the base 13 and the waist portions 9 of the web 8 can be twisted about the centerline 5 of the plate 4 such that the longitudinal centerline 5 of the plate 4 follows a three dimensional shape. Such three dimensional shapes can have at least a part forming: a circular helix having a constant radius of curvature; and a spiral helix having a varying radius of curvature.

The plate 4 described by way of example has a longitudinally spaced apart plurality of diamond shaped openings 12 in the web 8. However the purpose of the diamond openings 12 can also be served by openings of other shapes. The purpose is to align the centerlines 5, 14 and to enable welding through the diamond holes 12. Alternatively the arms 7 could also be welded if necessary however a small plug weld or fillet weld in the diamond holes 12 has been found to be sufficient and simplifies alignment of the centerlines 5, 14.

The openings 12 preferably have at least one notch aligned with the longitudinal centerline 5 of the plate 4 and at least one notch aligned with a transverse centerline 15 of an associated pair of arms 7. Where the openings have diamond shape two points are aligned with the longitudinal centerline 5 of the plate 4 and two points are aligned with the transverse centerline 15 of an associated pair of arms 7.

Although the above description relates to a specific preferred embodiment as presently contemplated by the inventor, it will be understood that the invention in its broad aspect includes mechanical and functional equivalents of the elements described herein.

I claim:

1. A curvable roller conveyor support, for supporting a longitudinally spaced apart array of transverse roller axles, the support comprising:
    a dentate elongate plate being laterally symmetric about a longitudinal centerline and having a plurality of lateral edge cutouts defining a plurality of longitudinally spaced apart opposing pairs of transverse arms, each arm having: a proximal end joined to an adjacent arm with a web having a plurality of central narrowed waist portions; and a distal end bent upwards defining a flange with a roller axle mount; and
    an elongate base secured to an underside surface of the dentate plate.

2. The curvable roller conveyor support according to claim 1, wherein the plate is secured to the base and the waist portions of the web are bent in one of: the plane of the plate; and a plane orthogonal to the plane of the plate, whereby the longitudinal centerline of the plate follows a two dimensional shape.

3. The curvable roller conveyor support according to claim 2, wherein the two dimensional shape has at least a part selected from the group consisting of: a straight line; a circular line having a constant radius of curvature; a spiral line having a varying radius of curvature; and a parabolic line.

4. The curvable roller conveyor support according to claim 1, wherein the plate is secured to the base and the waist portions of the web are twisted about the centerline of the plate whereby the longitudinal centerline of the plate follows a three dimensional shape.

5. The curvable roller conveyor support according to claim 4, wherein the three dimensional shape has at least a part selected from the group consisting of: a circular helix having a constant radius of curvature; and a spiral helix having a varying radius of curvature.

6. The curvable roller conveyor support according to claim 4, wherein the arms are banked.

7. The curvable roller conveyor support according to claim 1, wherein the web has a longitudinally spaced apart plurality of openings.

8. The curvable roller conveyor support according to claim 7, wherein the openings have at least one notch aligned with the longitudinal centerline of the plate.

9. The curvable roller conveyor support according to claim 7, wherein the openings have at least one notch aligned with a transverse centerline of an associated pair of arms.

10. The curvable roller conveyor support according to claim 7, wherein the openings have diamond shape with points aligned with the longitudinal centerline of the plate and the transverse centerline of an associated pair of arms.

11. The curvable roller conveyor support according to claim 7, wherein the web of the plate and the base are joined with welds in the openings.

* * * * *